(12) United States Patent
Cui et al.

(10) Patent No.: US 8,359,388 B2
(45) Date of Patent: Jan. 22, 2013

(54) RACF SYSTEM AND EQUIPMENT HAVING DYNAMIC DISCOVERING FUNCTION IN NEXT GENERATION NETWORK

(75) Inventors: Ying Cui, Shenzhen (CN); Zhimeng Teng, Shenzhen (CN); Chaofeng Zhang, Shenzhen (CN)

(73) Assignee: ZTE Corporation (CN)

( * ) Notice: Subject to any disclaimer, the term of this patent is extended or adjusted under 35 U.S.C. 154(b) by 254 days.

(21) Appl. No.: 13/001,576

(22) PCT Filed: Jun. 30, 2008

(86) PCT No.: PCT/CN2008/071491
§ 371 (c)(1),
(2), (4) Date: Dec. 27, 2010

(87) PCT Pub. No.: WO2010/000105
PCT Pub. Date: Jan. 7, 2010

(65) Prior Publication Data
US 2011/0099275 A1    Apr. 28, 2011

(51) Int. Cl.
*G06F 15/16*    (2006.01)
*G06F 15/173*    (2006.01)
(52) U.S. Cl. .......................... 709/224; 709/203; 709/223
(58) Field of Classification Search .................. 709/203, 709/217, 223, 224, 226; 705/7; 711/150; 715/735
See application file for complete search history.

(56) References Cited

U.S. PATENT DOCUMENTS

| | | | | |
|---|---|---|---|---|
| 6,732,170 | B2 * | 5/2004 | Miyake et al. | 709/223 |
| 7,216,166 | B2 * | 5/2007 | Sugauchi et al. | 709/224 |
| 2001/0042118 | A1 * | 11/2001 | Miyake et al. | 709/223 |
| 2004/0059811 | A1 * | 3/2004 | Sugauchi et al. | 709/224 |
| 2005/0125457 | A1 | 6/2005 | Kang | |
| 2008/0034166 | A1 * | 2/2008 | Shavit et al. | 711/150 |
| 2008/0086347 | A1 * | 4/2008 | Yokota et al. | 705/7 |
| 2010/0205535 | A1 * | 8/2010 | Mitamura et al. | 715/735 |

FOREIGN PATENT DOCUMENTS

| | | |
|---|---|---|
| CN | 1625126 A | 6/2005 |
| CN | 101075914 A | 11/2007 |

OTHER PUBLICATIONS

International Search Report for PCT/CN2008/071491, Completed by the Chinese Patent Office Feb. 19, 2009, 4 pages.

* cited by examiner

*Primary Examiner* — Quang N Nguyen
(74) *Attorney, Agent, or Firm* — Brooks Kushman P.C.

(57) ABSTRACT

A resource admission control function system having dynamic discovering function in a next generation network is provided. The resource admission control function system comprises a transport resource control function entity and a policy decision function entity that intercommunicate with each other; the system also comprises a dynamic discovering function unit for dynamically collecting and saving information of connection relationship between various function entities in the network, receiving an inquiry request, and feeding back the information of connection relation meeting the inquiry conditions to an inquiry request submitting entity.

10 Claims, 6 Drawing Sheets

RACF SYSTEM AND EQUIPMENT HAVING DYNAMIC DISCOVERING FUNCTION IN NEXT GENERATION NETWORK

TECHNICAL FIELD

The present invention relates to the field of communication technology, and in particular, to an RACF (Resource Admission Control Function) system and equipment in a next generation network (NGN).

BACKGROUND OF THE INVENTION

In the definition of RACF (Resource Admission Control Function) in Y.2111 of the NGN standard organization of ITU-T (International Telecommunications Union-Telecommunication Standardization Sector), a RACF system is described as including two control function entities: a PD-FE (Policy Decision Function Entity) and a TRC-FE (Transport Resource Control Function Entity). Meanwhile, this standard also defines two transport function entities: a PE-FE (Policy Enforcement Function Entity) and a TRE-FE (Transport Resource Enforcement Function Entity), both of which belong to the transport function layer. Y.2111 describes that there are requirement for one-to-multiple and multiple-to-one correspondence between PD-FE and PE-FE, PD-FE and TRC-FE and also requirement for interconnection between multiple examples of each function entity.

As for how to discover the presence of the other side for these function entities, Y.2111 does not provide any corresponding description, nor describe the method that should support dynamic discovering. In a common situation, we can adopt means of static configuration such as SNMP (Simple Network Management Protocol) to enable a function entity to discover the presence of a neighbor, who may be the same function entity as itself or another function entity. The method of static configuration has defects including requiring corresponding work of network management, unable to know a neighbor's change quickly and in time, and unable to know the relationship of interconnection of automatic update quickly and in time, which will cause a wrong decision on transport function control.

SUMMARY OF THE INVENTION

The technical problem to be solved in the present invention is to provide an RACF system and equipment having dynamic discovering function in a next generation network to solve the technical problem that the RACF system in the prior art cannot dynamically discover the change of function entities.

In order to solve the above technical problem, the present invention provides a resource admission control function system having dynamic discovering function in a next generation network. The resource admission control function system comprises a transport resource control function entity and a policy decision function entity that intercommunicate with each other. The system also comprises a dynamic discovering function unit for dynamically collecting and saving information of connection relationship between various function entities in the network, receiving an inquiry request, and feeding back the information of connection relation meeting the inquiry conditions to an inquiry request submitting entity.

Furthermore, the above system is also characterized in that the dynamic discovering function unit specifically comprises:
an information collecting sub-unit for dynamically collecting information of connection relationship between various function entities in the network;
an information storing sub-unit for storing and/or updating the information of connection relationship; and
an inquiry responding sub-unit for inquiring information of connection relationship that meets inquiry conditions in the information storing sub-unit after receiving an inquiry request and feeding back the information to an inquiry request submitting entity.

Furthermore, the above system is also characterized in that the dynamic discovering function unit is connected with the transport resource control function entity and/or the policy decision function entity.

Furthermore, the above system is also characterized in that the dynamic discovering function unit is disposed within the transport resource control function entity and/or the policy decision function entity.

Furthermore, the above system is also characterized in that the dynamically collecting comprises: initiatively inquiring and obtaining the information of connection relationship between various function entities in the network and/or when the function entities in the network change, obtaining information of connection relationship between various function entities after the change upon receiving information about the change.

Furthermore, the above system is also characterized in that the change of the function entities comprises: addition and withdrawal of the function entities.

The present invention also provides a resource admission control function equipment having dynamic discovering function in a next generation network. This equipment is disposed in a resource admission control function system and comprises:
an information collecting sub-unit for dynamically collecting information of connection relationship between various function entities in the network;
an information storing sub-unit for storing and/or updating the information of connection relationship; and
an inquiry responding sub-unit for inquiring information of connection relationship that meets inquiry conditions in the information storing sub-unit after receiving an inquiry request and feeding back the information to an inquiry request submitting entity.

Furthermore, the above equipment is also characterized in that the equipment is connected with a transport resource control function entity and/or a policy decision function entity in the resource admission control function system.

Furthermore, the above equipment is also characterized in that the equipment is disposed within a transport resource control function entity and/or a policy decision function entity in the resource admission control function system.

Furthermore, the above equipment is also characterized in that the dynamically collecting comprises: initiatively inquiring and obtaining the information of connection relationship between various function entities in the network and/or when the function entities in the network change, obtaining information of connection relationship between various function entities after the change upon receiving information about the change.

Furthermore, the above equipment is also characterized in that the change of the function entities comprises: addition and withdrawal of the function entities.

When the present invention is carried out, if the function entities are one-to-multiple or multiple-to-one connected or multiple same function entities are interconnected with each other, discovery of a neighbor can be achieved through connection information that is dynamically discovered, rather than depending on static configurations, thereby responding to the change in time, fast positioning desired information of function entities and automatically and efficiently maintaining connection information. When QoS control is transmitted and processed, the related function entities involved in the processing will be fast and accurately positioned, thereby reducing processing of other function entities, and decreasing the information content of communication between function entities.

PREFERRED EMBODIMENTS OF THE INVENTION

Figure 1:
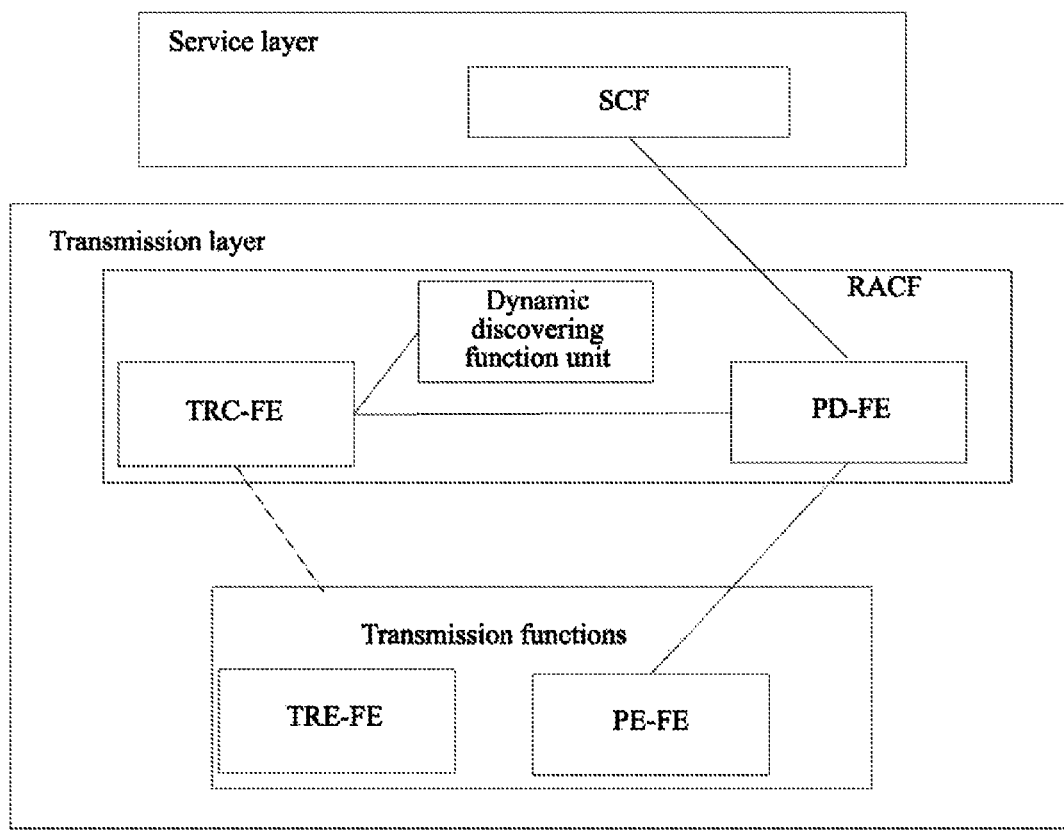
FIG. 1 is a schematic diagram of the network structure of the first example of the RACF system having dynamic discovering function in a NGN provided in the present invention.
Figure 2:
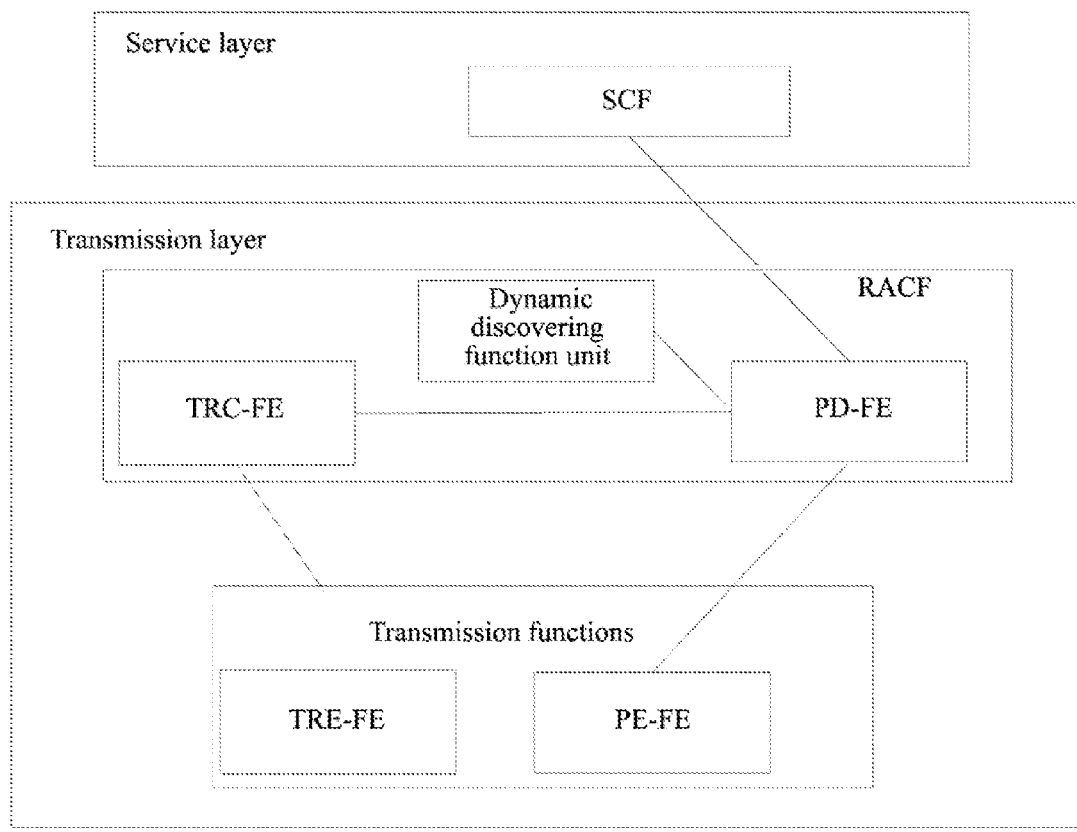
FIG. 2 is a schematic diagram of the network structure of the second example of the RACF system having dynamic discovering function in a NGN provided in the present invention.
Figure 3:
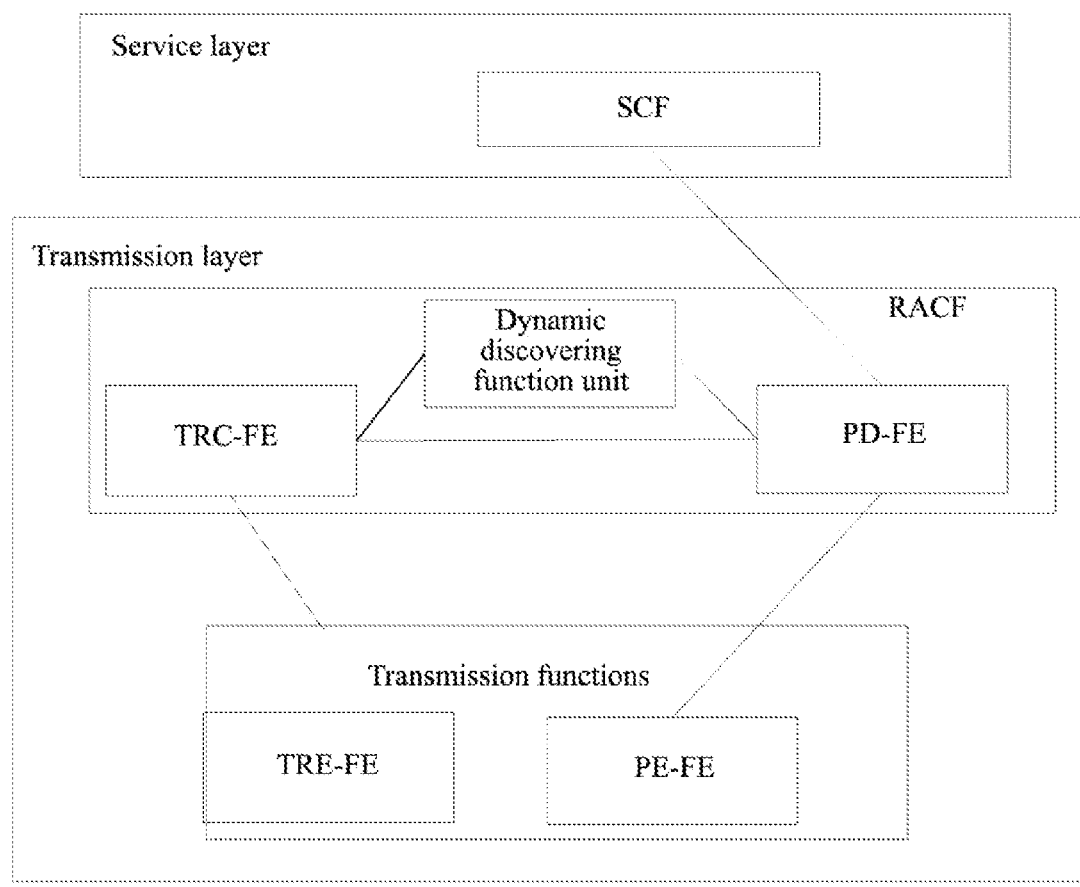
FIG. 3 is a schematic diagram of the network structure of the third example of the RACF system having dynamic discovering function in a NGN provided in the present invention.
Figure 4:
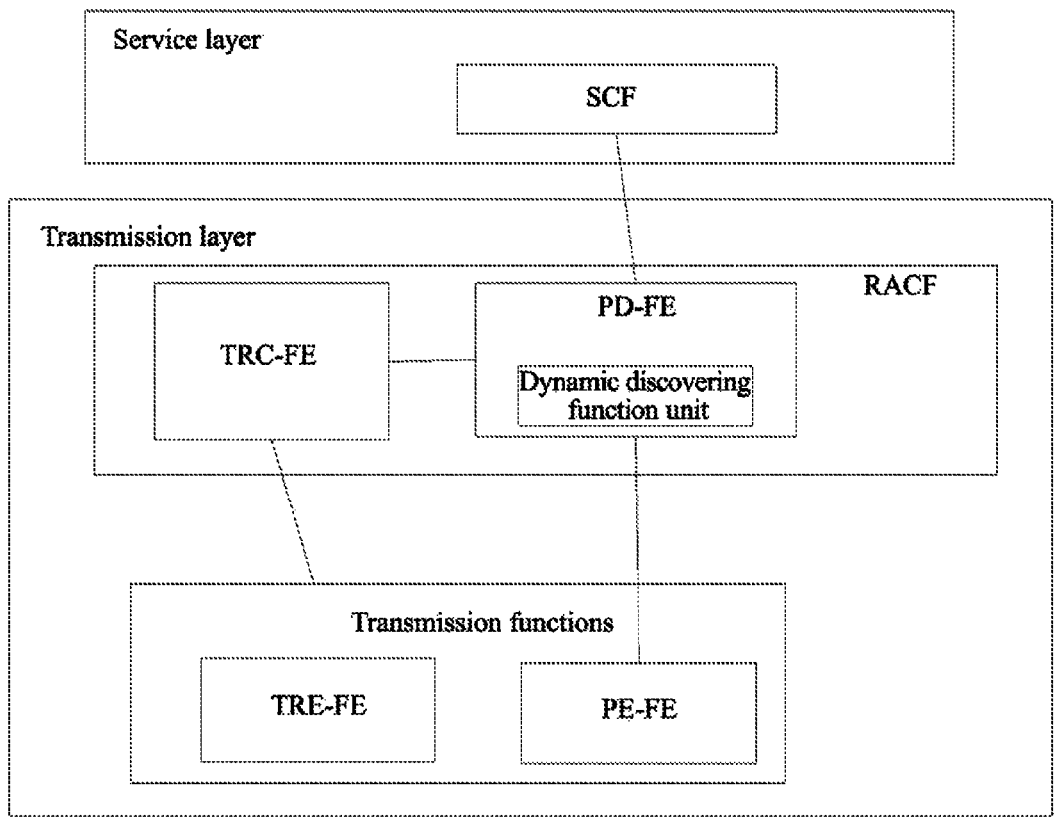
FIG. 4 is a schematic diagram of the network structure of the fourth example of the RACF system having dynamic discovering function in a NGN provided in the present invention.
Figure 5:
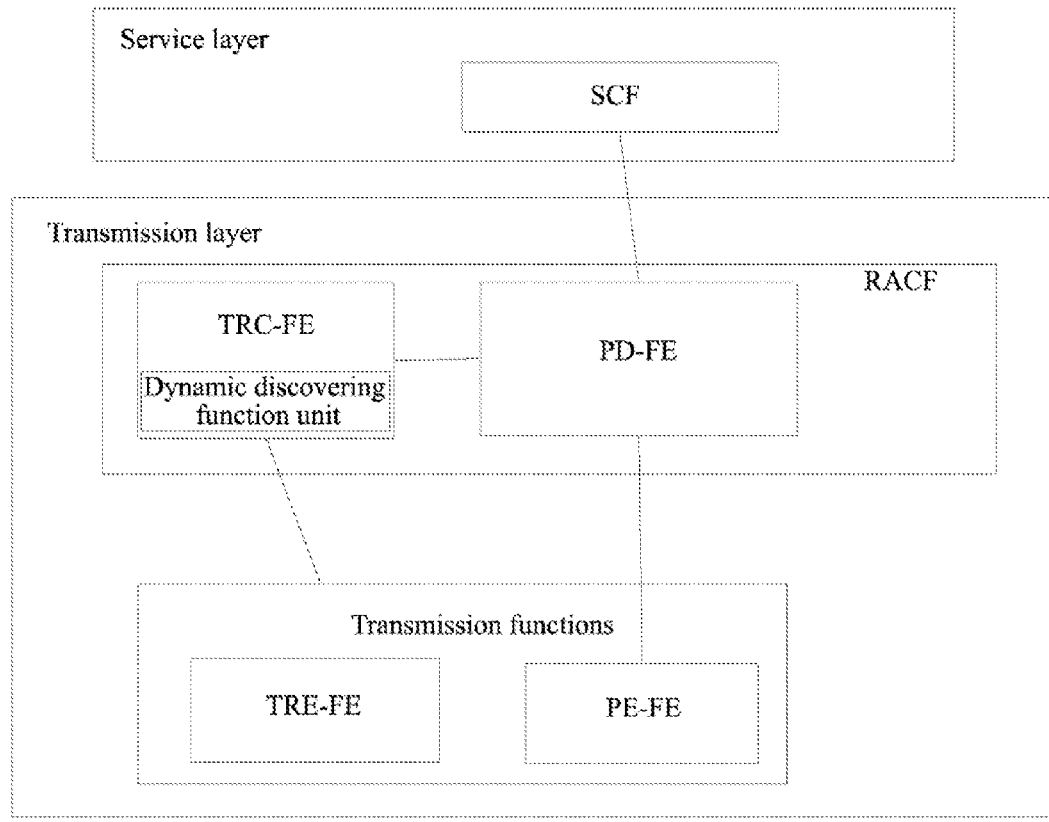
FIG. 5 is a schematic diagram of the network structure of the fifth example of the RACF system having dynamic discovering function in a NGN provided in the present invention.

Referring to FIG. 1, this figure is an illustration for the network structure of the first example of the RACF system having dynamic discovering function in a NGN provided in the present invention. As shown in the figure, a RACF system comprises a TRC-FE and a PD-FE that intercommunicate with each other, and it also comprises a dynamic discovering function unit which is connected with the TRC-FE. In the second example of the present invention as shown in FIG. 2, the dynamic discovering function unit is connected with the PD-FE. Other connecting manners can also be adopted, of course. For example, in the third example of the present invention as shown in FIG. 3, the dynamic discovering function unit is connected with both the TRC-FE and PD-FE; in the fourth example of the present invention as shown in FIG. 4, the dynamic discovering function unit is disposed in the PD-FE; in the fifth example of the present invention as shown in FIG. 5, the dynamic discovering function unit is disposed in the TRC-FE. It should be pointed out that the dynamic discovering function unit may be presented as software or hardware.

The RACF system intercommunicates with SCF (Service Control Functions), PE-FE, TRE-FE and so on. Of course, the network structures in the examples do not include all the function entities, and a person having ordinary skill in the art can acquire a complete network structure diagram by consulting materials such as Y.2111 standards of ITU-T.

Figure 6:
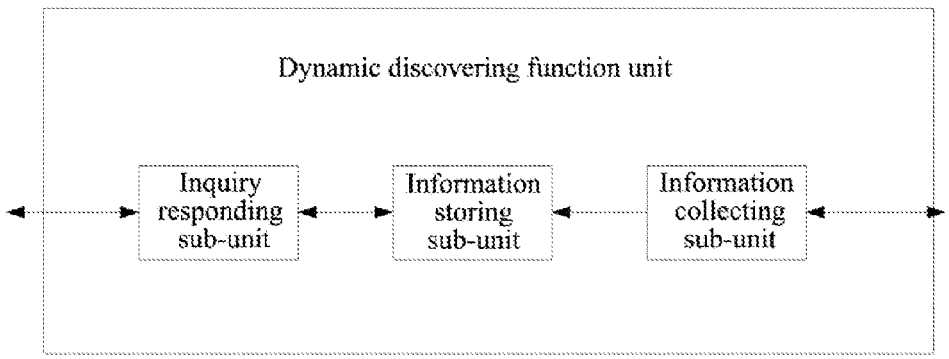
FIG. 6 is a diagram of the structure of a function module of the RACF equipment having dynamic discovering function in a NGN provided in the present invention.

Referring to FIG. 6, this figure shows the internal structure of the dynamic discovering function unit, i.e., a RACF equipment having dynamic discovering function in a NGN provided in the present invention. As shown in the figure, the dynamic discovering function unit comprises an information collecting sub-unit for dynamically collecting information of connection relationship between various function entities in the network; an information storing sub-unit for storing and/or updating the information of connection relationship; and an inquiry responding sub-unit for inquiring information of connection relationship that meets inquiry conditions in the information storing sub-unit after receiving an inquiry request and feeding back the information to an inquiry request submitting entity.

Figure 7:
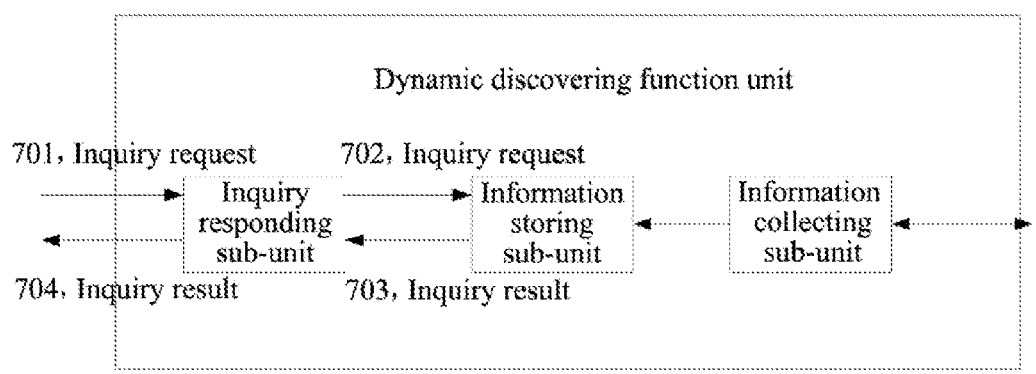
FIG. 7 is a chart of the data flow during inquiry in the equipment shown in FIG. 6.

Specifically, referring to FIG. 7, when an inquiry event occurs, the operating processes inside the dynamic discovering function unit comprises: 701, the inquiry responding sub-unit receiving an external inquiry request; 702, the inquiry responding sub-unit traversing in the information storing sub-unit according to the request; 703, the inquiry responding sub-unit inquiring an inquiry result, i.e., connection relationship information that meets inquiry conditions; 704, the inquiry responding sub-unit feeding back the result to an inquiry request submitting entity (function unit).

Figure 8:
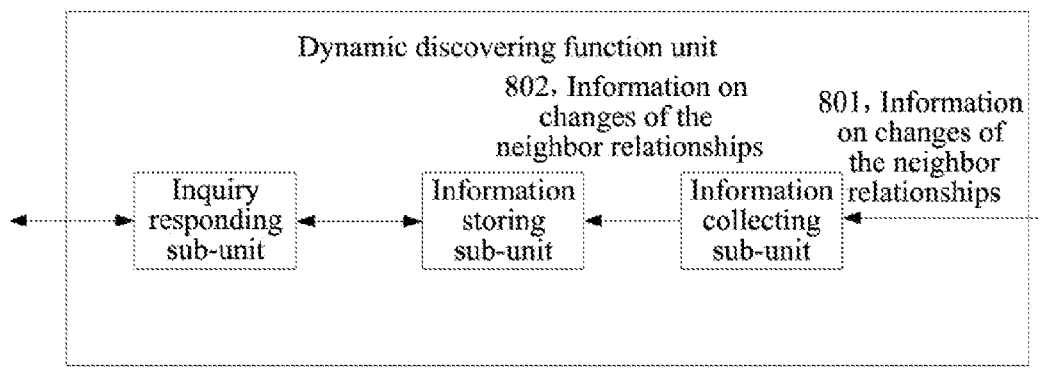
FIG. 8 is a chart of the data flow during dynamic updating in the equipment shown in FIG. 6.

Specifically, referring to FIG. 8, when the dynamic collecting event occurs, one of the operating processes inside the dynamic discovering function unit comprises: 801, the information collecting sub-unit receiving change information of the external information, wherein the change can be increase of neighbor relationships, or deletion of neighbor relationships (addition or withdrawal of function entities (PD-FE, TRC-FE, PE-FE and so on)); in a NGN environment, the change information can be reported respectively from TRC-FE, PD-FE, PE-FE and TRE-FE, or be collectively reported by TRC-FE and PD-FE; 802, the information collecting sub-unit feeding back the information to the information storing sub-unit, and the information storing sub-unit updating the local information base, i.e., updating the information of the connection relationship between these function entities.

The dynamic collecting also comprises: the information collecting sub-unit timed sending inquiry requests to each function entities in the network, after receiving the inquiry requests, the inquired function entities responding to the inquiry requests and feeding back the information of the connection relationship to the information collecting sub-unit according to the inquiry information. Meanwhile, each function entity dynamically receives a message about the change of neighbor information and informs other neighbors of the message about the change of the local information. The information collecting sub-unit supports multi-level inquiry and response.

It can be seen from the above preferred examples that in the present invention, discovery of a neighbor can be achieved through connection information that is dynamically discovered, rather than depending on static configurations, thereby responding to the change in time, fast positioning desired information of function entities and automatically and efficiently maintaining connection information. When QoS control is transmitted and processed, the related function entities involved in the processing will be fast and accurately positioned, thereby reducing processing of other function entities, and decreasing the information content of communication between function entities.

The above examples are intended for better understanding of the present invention, rather than limiting the protection scope of the present invention.

INDUSTRIAL APPLICABILITY

In the present invention, discovery of the presence of a neighbor can be achieved through connection information that is dynamically discovered, rather than depending on static configurations, thereby responding to the change in time, fast positioning desired information of function entities and automatically and efficiently maintaining connection information. When QoS control is transmitted and processed, the related function entities involved in the processing will be fast and accurately positioned, thereby reducing processing of other function entities, and decreasing the information content of communication between function entities.

What we claimed is:

1. A resource admission control function system having dynamic discovering function in a next generation network, the resource admission control function system comprising:
   a transport resource control function entity and a policy decision function entity that intercommunicate with each other;
   a dynamic discovering function unit for dynamically collecting and saving information of connection relationship between various function entities in the network, receiving an inquiry request, and feeding back the information of connection relation meeting inquiry conditions to an inquiry request submitting entity;
   wherein the dynamic discovering function unit specifically comprises:
      an information collecting sub-unit for dynamically collecting information of connection relationship between various function entities in the network;
      an information storing sub-unit for storing and/or updating the information of connection relationship; and
      an inquiry responding sub-unit for inquiring information of connection relationship that meets inquiry conditions in the information storing sub-unit after receiving an inquiry request and feeding back the information to an inquiry request submitting entity;
      wherein the dynamic discovering function unit is disposed within the transport resource control function entity and/or a policy decision function entity in the resource admission control function system;
      wherein the dynamically collecting comprises: initiatively inquiring and obtaining the information of connection relationship between various function entities in the network and/or when the function entities in the network change, obtaining information of connection relationship between various function entities after the change upon receiving information about the change;
      wherein the change of the function entities comprises: addition and withdrawal of the function entities.

2. The system of claim 1, wherein the dynamic discovering function unit is connected with the transport resource control function entity and/or the policy decision function entity.

3. The system of claim 1, wherein the dynamic discovering function unit is connected with the transport resource control function entity and/or the policy decision function entity.

4. The system of claim 1, wherein the dynamic discovering function unit is disposed within the transport resource control function entity and/or the policy decision function entity.

5. The system of claim 1, wherein the dynamically collecting comprises: initiatively inquiring and obtaining the information of connection relationship between various function entities in the network and/or when the function entities in the network change, obtaining information of connection relationship between various function entities after the change upon receiving information about the change.

6. The system of claim 1, wherein the change of the function entities comprises: addition and withdrawal of the function entities.

7. A resource admission control function equipment having dynamic discovering function in a next generation network, disposed in a resource admission control function system, and comprising:
   an information collecting sub-unit for dynamically collecting information of connection relationship between various function entities in the network;
   an information storing sub-unit for storing and/or updating the information of connection relationship; and
   an inquiry responding sub-unit for inquiring information of connection relationship that meets inquiry conditions in the information storing sub-unit after receiving an inquiry request and feeding back the information to an inquiry request submitting entity;
   wherein the equipment is disposed within a transport resource control function entity and/or a policy decision function entity in the resource admission control function system;
   wherein the dynamically collecting comprises: initiatively inquiring and obtaining the information of connection relationship between various function entities in the network and/or when the function entities in the network change, obtaining information of connection relationship between various function entities after the change upon receiving information about the change;
   wherein the change of the function entities comprises: addition and withdrawal of the function entities.

8. An equipment of claim 7, wherein the equipment is connected with a transport resource control function entity and/or a policy decision function entity in the resource admission control function system.

9. An equipment of claim 8, wherein the dynamically collecting comprises: initiatively inquiring and obtaining the information of connection relationship between various function entities in the network and/or when the function entities in the network change, obtaining information of connection relationship between various function entities after the change upon receiving information about the change.

10. An equipment of claim 7, wherein the dynamically collecting comprises: initiatively inquiring and obtaining the information of connection relationship between various function entities in the network and/or when the function entities in the network change, obtaining information of connection relationship between various function entities after the change upon receiving information about the change.

* * * * *